United States Patent
Nagayo et al.

(10) Patent No.: US 10,934,887 B2
(45) Date of Patent: Mar. 2, 2021

(54) ROTARY MACHINE

(71) Applicant: MITSUBISHI HEAVY INDUSTRIES ENGINE & TURBOCHARGER, LTD., Sagamihara (JP)

(72) Inventors: Yukihide Nagayo, Tokyo (JP); Tomoaki Takeshita, Tokyo (JP); Yosuke Dammoto, Tokyo (JP); Shinji Ogawa, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 179 days.

(21) Appl. No.: 16/087,450

(22) PCT Filed: Mar. 30, 2016

(86) PCT No.: PCT/JP2016/060386
§ 371 (c)(1),
(2) Date: Sep. 21, 2018

(87) PCT Pub. No.: WO2017/168634
PCT Pub. Date: Oct. 5, 2017

(65) Prior Publication Data
US 2019/0101023 A1 Apr. 4, 2019

(51) Int. Cl.
*F02C 6/12* (2006.01)
*F01D 25/16* (2006.01)
(Continued)

(52) U.S. Cl.
CPC ........... *F01D 25/164* (2013.01); *F01D 25/04* (2013.01); *F01D 25/243* (2013.01); *F02B 33/40* (2013.01);
(Continued)

(58) Field of Classification Search
CPC .. F02C 6/12; F02C 7/24; F01D 25/265; F01D 25/243; F01D 25/164; F04D 25/04;
(Continued)

(56) References Cited

U.S. PATENT DOCUMENTS 5,210,945 A 5/1993 Suzuki
2008/0223956 A1 9/2008 Jinnai et al.
(Continued)

FOREIGN PATENT DOCUMENTS

CN 104204538 A 12/2014
JP 63-158546 U 10/1988
(Continued)

OTHER PUBLICATIONS

Extended European Search Report dated Jul. 24, 2019 in corresponding European Application No. 16896853.5.
(Continued)

*Primary Examiner* — Aaron R Eastman
*Assistant Examiner* — Maxime M Adjagbe
(74) *Attorney, Agent, or Firm* — Birch, Stewart, Kolasch & Birch, LLP

(57) ABSTRACT

A rotary machine include: a rotational shaft; an impeller mounted to the rotational shaft; an impeller housing accommodating the impeller; a bearing housing accommodating a bearing which supports the rotational shaft rotatably, the bearing housing being fastened to the impeller housing; and a fastening member fastening the impeller housing and the bearing housing in an axial direction of the rotational shaft. The impeller housing, the bearing housing, and the fastening member each includes a contact surface in a direction intersection with an axial direction of the rotational shaft. A thin-plate member formed separately from the impeller housing, the bearing housing, and the fastening member is interposed between at least two of the contact surfaces.

12 Claims, 15 Drawing Sheets

(51) Int. Cl.
  *F02B 39/00* (2006.01)
  *F01D 25/04* (2006.01)
  *F01D 25/24* (2006.01)
  *F02B 33/40* (2006.01)
  *F16F 15/129* (2006.01)

(52) U.S. Cl.
  CPC .............. *F02B 39/00* (2013.01); *F02C 6/12* (2013.01); *F16F 15/129* (2013.01); *F05D 2220/40* (2013.01); *F05D 2260/39* (2013.01); *F05D 2260/96* (2013.01); *F16F 2230/22* (2013.01)

(58) Field of Classification Search
  CPC ........ F04D 25/243; F04B 37/00; F04B 39/00; F05D 2260/39; F05D 2260/96; F05D 2240/40
  See application file for complete search history.

(56) References Cited

U.S. PATENT DOCUMENTS

2013/0154194 A1 6/2013 Van Saun
2015/0049967 A1* 2/2015 Fraser ................ F04D 29/0473
            384/100

FOREIGN PATENT DOCUMENTS

| JP | 7-189723 A | 7/1995 |
| JP | 2006-90402 A | 4/2006 |
| JP | 2008-215083 A | 9/2008 |
| JP | 2010-174811 A | 8/2010 |
| JP | 2013-130136 A | 7/2013 |
| JP | 2013-227889 A | 11/2013 |
| JP | 2015-194092 A | 11/2015 |
| WO | WO 2011/152454 A1 | 12/2011 |
| WO | WO 2013/148412 A1 | 10/2013 |

OTHER PUBLICATIONS

Office Action dated May 7, 2019 issued to the corresponding Japanese Application No. 2018-507938 with an English Machine Translation.

International Preliminary Report on Patentability dated Oct. 11, 2018 in corresponding PCT Application No. PCT/JP2016/060386 with an English Translation.

International Search Report dated Jun. 28, 2016 issued in corresponding PCT Application No. PCT/JP2016/060386.

Office Action dated Apr. 13, 2020 issued in counterpart Chinese Application No. 201680084109.5.

* cited by examiner

ENLARGED VIEW OF A

ENLARGED VIEW OF B

ENLARGED VIEW OF B

ENLARGED VIEW OF C

ENLARGED VIEW OF B

ENLARGED VIEW OF C

ROTARY MACHINE

TECHNICAL FIELD

The present disclosure relates to a rotary machine.

BACKGROUND ART

As an example of rotary machine, known is a turbocharger, for instance, which is mounted to an automobile or the like and increases the air-supply amount to increase output.

In a rotary machine such as a turbocharger, vibration of the rotational shaft caused by weight unbalance of the rotational shaft may transfer to the housing, and the shaft vibration may act as a vibratory force that causes vibration of the housing, which may generate noise.

Patent Document 1 discloses providing a damping member having a damping property or an elastic property, on the outer side of a bearing bush supporting the rotational shaft, and an inertial mass body that vibrates in an opposite phase from the bearing bush upon vibration of the bearing bush.

CITATION LIST

Patent Literature

Patent Document 1: JP2010-174811A

SUMMARY

Problems to be Solved

The vibration prevention technique disclosed in Patent Document 1 requires providing a damping member and an inertial mass body, which may increase the weight and make the structure complex.

In view of the above, an object of at least one embodiment of the present invention is to suppress vibration and noise that occur in a rotary machine with a simple configuration.

Solution to the Problems (1) A rotary machine according to some embodiments includes: a rotational shaft; an impeller mounted to the rotational shaft; an impeller housing accommodating the impeller; a bearing housing accommodating a bearing which supports the rotational shaft rotatably, the bearing housing being fastened to the impeller housing; and a fastening member fastening the impeller housing and the bearing housing in an axial direction of the rotational shaft. The impeller housing includes, at a fastening part to which a fastening force is applied by the fastening member, impeller-housing side contact surfaces extending in a direction which intersects with an axial direction of the rotational shaft, the impeller-housing side contact surfaces including an impeller-housing side first contact surface in contact with the fastening member and an impeller-housing side second contact surface in contact with the bearing housing. The bearing housing includes, at the fastening part, bearing-housing side contact surfaces extending in a direction which intersects with the axial direction of the rotational shaft, the bearing-housing side contact surfaces including a bearing-housing side first contact surface in contact with the fastening member and a bearing-housing side second contact surface in contact with the impeller housing. The fastening member includes fastening-member side contact surfaces extending in a direction which intersects with the axial direction of the rotational shaft, the fastening-member side contact surfaces including a fastening-member side first contact surface in contact with the impeller housing and a fastening-member side second contact surface in contact with the bearing housing. A thin-plate member is interposed in at least one location between the impeller-housing side first contact surface and the fastening-member side first contact surface, between the bearing-housing side first contact surface and the fastening-member side second contact surface, or between the impeller-housing side second contact surface and the bearing-housing side second contact surface. The thin-plate member is provided separately from the impeller housing, the bearing housing, and the fastening member.

With the above configuration (1), the thin-plate member is interposed between the two contact surfaces formed by the impeller housing, the bearing housing, and the fastening member, and thereby a contact part increases between the two contact surfaces, which leads to generation of small relative vibration (micro-vibration in a direction along the contact surfaces) between the two contact surfaces. Accordingly, friction occurs between the two contact surfaces, and the friction damping effect attenuates the shaft vibration from the rotational shaft, and thus it is possible to suppress vibration and noise that occur in the rotary machine.

(2) In some embodiments, in the above configuration (1), at least one of the impeller-housing side first contact surface, the impeller-housing side second contact surface, the bearing-housing side first contact surface, the bearing-housing side second contact surface, the fastening-member side first contact surface, or the fastening-member side second contact surface includes at least one recess portion.

With the above configuration (2), with at least one of the two contact surfaces having the recess portion, the contact part between the thin-plate member and the contact surfaces decreases, and thereby slight backlash (micro-vibration in a direction intersecting with the contact surfaces) is more likely to occur between the thin-plate member and the contact surfaces, in addition to the above described micro relative vibration. When the slight backlash occurs between the contact surfaces, the shaft vibration from the rotational shaft is attenuated by a collision damping effect. Accordingly, it is possible to suppress vibration and noise that occur in the rotary machine even further.

(3) In some embodiments, in the above configuration (2), the at least one recess portion includes a plurality of recess portions disposed at intervals in a circumferential direction of the rotational shaft.

With the above configuration (3), it is possible to improve the effect to attenuate vibration even further, with the friction damping effect and the collision damping effect exerted by the plurality of recess portions formed in the circumferential direction of the rotational shaft.

(4) In some embodiments, in the above configuration (2) or (3), the at least one recess portion is formed on at least one of two of the contact surfaces forming at least one location where the thin-plate member is interposed, between the impeller-housing side first contact surface and the fastening-member side first contact surface, between the bearing-housing side first contact surface and the fastening-member side second contact surface, or between the impeller-housing side second contact surface and the bearing-housing side second contact surface.

With the above configuration (4), the recess portions are formed on at least one of the two contact surfaces between which the thin-plate member is interposed, and thereby it is possible to further improve the effect to attenuate vibration, with the friction damping effect from friction generated between the thin-plate member and the contact surfaces, and the synergistic effect of the friction damping effect and the collision damping effect achieved by providing the recess portions.

(5) In some embodiments, in any one of the above configurations (1) to (4), the impeller housing includes an impeller-housing side flange portion extending outward in a radial direction of the rotational shaft. The bearing housing includes a bearing-housing side flange portion which is in contact with the impeller-housing side flange portion, the bearing-housing side flange portion extending outward in the radial direction of the rotational shaft. The impeller-housing side second contact surface is formed on the impeller-housing side flange portion, and the bearing-housing side second contact surface is formed on the bearing-housing side flange portion. The fastening member includes a coupling which holds together the impeller-housing side flange portion and the bearing-housing side flange portion.

With the above configuration (5), in a rotary machine in which the fastening member is a coupling that nips the impeller-housing side flange portion and the bearing-housing side flange portion, it is possible to suppress vibration and noise that occur in the rotary machine.

Further, for existing two contact surfaces are utilized, there is no need to modify the rotary machine.

(6) In some embodiments, in the above configuration (5), the thin-plate member is a single thin-plate member interposed between the impeller-housing side first contact surface and the fastening-member side first contact surface, and between the bearing-housing side first contact surface and the fastening-member side second contact surface.

With the above configuration (6), in addition to the effect of the above configuration (5), with the thin-plate member interposed between the two contact surfaces to which a pressing force is applied by the coupling, it is possible to improve the vibration damping effect. Further, the thin-plate member is formed by a single thin-plate member, and thus can be produced readily, and interposed readily between the contact surfaces.

(7) In some embodiments, in any one of the above configurations (1) to (4), the impeller housing includes an impeller-housing side protruding portion extending inward with respect to a radial direction of the rotational shaft. The bearing housing includes a bearing-housing side protruding portion which is in contact with the impeller-housing side protruding portion and which extends outward in the radial direction of the rotational shaft. The impeller-housing side second contact surface is formed on the impeller-housing side protruding portion, and the bearing-housing side second contact surface is formed on the bearing-housing side protruding portion. The fastening member includes a snap ring to be fitted into an annular groove formed on an inner peripheral surface of the impeller housing, the snap ring being configured to bias the bearing-housing side second contact surface toward the impeller-housing side second contact surface by engagement of an outer peripheral portion of the snap ring with the annular groove.

With the above configuration (7), in the rotary machine where the fastening member is a snap ring configured to bias the bearing-housing side second contact surface toward the impeller-housing side second contact surface, it is possible to suppress vibration and noise that occur in the rotary machine.

Further, for existing two contact surfaces are utilized, there is no need to modify the rotary machine.

(8) In some embodiments, in the above configuration (7), the thin-plate member is interposed between the impeller-housing side second contact surface and the bearing-housing side second contact surface.

With the above configuration (8), in addition to the effect of the above configuration (7), with the thin-plate member interposed between the two contact surfaces to which a pressing force is applied by the snap ring, it is possible to improve the vibration damping effect.

(9) In some embodiments, in the above configuration (7), the thin-plate member is interposed between the fastening-member side second contact surface and the bearing-housing side first contact surface.

With the above configuration (9), in addition to the effect of the above configuration (7), with the thin-plate member interposed between the two contact surfaces to which a pressing force is applied by the snap ring, it is possible to improve the vibration damping effect.

(10) In some embodiments, in any one of the above configurations (1) to (4), the bearing housing includes a bearing-housing side extension portion extending outward in a radial direction of the rotational shaft. The impeller housing includes an impeller-housing side bolt receiving portion positioned on an outer side of the bearing-housing side extension portion, with respect to the radial direction of the rotational shaft, and an impeller-housing side extension portion which is in contact with the bearing-housing side extension portion and which extends inward in the radial direction of the rotational shaft from the impeller-housing side bolt receiving portion. The impeller-housing side second contact surface is formed on the impeller-housing side extension portion, and the bearing-housing side second contact surface is formed on the bearing-housing side extension portion. The fastening member includes a bolt to be screwed into a screw hole formed on the impeller-housing side bolt receiving portion, the bolt being configured to bias the bearing-housing side second contact surface toward the impeller-housing side second contact surface by being screwed into the screw hole.

With the above configuration (10), in the rotary machine where the fastening member is a bolt configured to bias the bearing-housing side second contact surface toward the impeller-housing side second contact surface, it is possible to suppress vibration and noise that occur in the rotary machine.

Further, for existing two contact surfaces are utilized, there is no need to modify the rotary machine.

(11) In some embodiments, in the above configuration (10), the thin-plate member is interposed between the impeller-housing side second contact surface and the bearing-housing side second contact surface.

With the above configuration (11), with the thin-plate member interposed between the two contact surfaces to which a pressing force is applied by the bolt, it is possible to improve the vibration damping effect.

(12) A rotary machine according to some embodiments of the present invention includes: a rotational shaft; an impeller mounted to the rotational shaft; an impeller housing accommodating the impeller; a bearing housing accommodating a bearing which supports the rotational shaft rotatably, the bearing housing being fastened to the impeller housing; and a fastening member fastening the impeller housing and the bearing housing in an axial direction of the rotational shaft. The impeller housing includes, at a fastening part to which a fastening force is applied by the fastening member, impeller-housing side contact surfaces extending in a direction which intersects with an axial direction of the rotational shaft, the impeller-housing side contact surfaces including an impeller-housing side first contact surface in contact with the fastening member and an impeller-housing side second contact surface in contact with the bearing housing. The bearing housing includes, at the fastening part, bearing-housing side contact surfaces extending in a direction which intersects with the axial direction of the rotational shaft, the bearing-housing side contact surfaces including a bearing-housing side first contact surface in contact with the fastening member and a bearing-housing side second contact surface in contact with the impeller housing. The fastening member includes fastening-member side contact surfaces extending in a direction which intersects with the axial direction of the rotational shaft, the fastening-member side contact surfaces including a fastening-member side first contact surface in contact with the impeller housing and a fastening-member side second contact surface in contact with the bearing housing. At least one of the impeller-housing side first contact surface, the impeller-housing side second contact surface, the bearing-housing side first contact surface, the bearing-housing side second contact surface, the fastening-member side first contact surface, or the fastening-member side second contact surface includes at least one recess portion.

With the above configuration (12), at least one recess portion is disposed on at least one of the two contact surfaces formed by the impeller housing, the bearing housing, and the fastening member, and thereby small relative vibration (micro-vibration in a direction along the contact surfaces) and small backlash (micro-vibration in a direction intersecting with the contact surfaces) are more likely to occur between the two contact surfaces. When the micro relative vibration occurs between the contact surfaces, friction occurs between the two contact surfaces, and the shaft vibration from the rotational shaft is attenuated by a friction damping effect. When the slight backlash occurs between the contact surfaces, the shaft vibration from the rotational shaft is attenuated by a collision damping effect. Accordingly, it is possible to suppress vibration and noise that occur in the rotary machine even further.

(13) In some embodiments, in the above configuration (12), the at least one recess portion includes a plurality of recess portions disposed at intervals in a circumferential direction of the rotational shaft.

With the above configuration (13), it is possible to improve the effect to attenuate vibration even further, with the collision damping effect exerted by the plurality of recess portions formed in the circumferential direction of the rotational shaft.

(14) In some embodiments, in the above configuration (12) or (13), the impeller housing includes an impeller-housing side protruding portion extending inward with respect to a radial direction of the rotational shaft. The bearing housing includes a bearing-housing side protruding portion which is in contact with the impeller-housing side protruding portion and which extends outward in the radial direction of the rotational shaft. The impeller-housing side second contact surface is formed on the impeller-housing side protruding portion, and the bearing-housing side second contact surface is formed on the bearing-housing side protruding portion. The fastening member comprises a snap ring to be fitted into an annular groove formed on an inner peripheral surface of the impeller housing, the snap ring being configured to bias the bearing-housing side second contact surface toward the impeller-housing side second contact surface by engagement of an outer peripheral portion of the snap ring into the annular groove.

With the above configuration (14), in the rotary machine where the fastening member is a snap ring configured to bias the bearing-housing side second contact surface toward the impeller-housing side second contact surface, it is possible to suppress vibration and noise that occur in the rotary machine.

Further, for existing two contact surfaces are utilized, there is no need to modify the rotary machine.

(15) In some embodiments, in the above configuration (12) or (13), the bearing housing includes a bearing-housing side extension portion extending outward in a radial direction of the rotational shaft. The impeller housing includes an impeller-housing side bolt receiving portion positioned on an outer side of the bearing-housing side extension portion, with respect to the radial direction of the rotational shaft, and an impeller-housing side extension portion which is in contact with the bearing-housing side extension portion and which extends inward in the radial direction of the rotational shaft from the impeller-housing side bolt receiving portion. The impeller-housing side second contact surface is formed on the impeller-housing side extension portion, and the bearing-housing side second contact surface is formed on the bearing-housing side extension portion. The fastening member includes a bolt screwed into a screw hole formed on the impeller-housing side bolt receiving portion, the bolt being configured to bias the bearing-housing side second contact surface toward the impeller-housing side second contact surface by being screwed into the screw hole.

With the above configuration (15), in the rotary machine where the fastening member is a bolt configured to bias the bearing-housing side second contact surface toward the impeller-housing side second contact surface, it is possible to suppress vibration and noise that occur in the rotary machine.

Further, for existing two contact surfaces are utilized, there is no need to modify the rotary machine.

Advantageous Effects

According to some embodiments, it is possible to reduce vibration of a rotary machine with a simple and low-cost configuration, and thereby suppress noise that occurs in the rotary machine.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
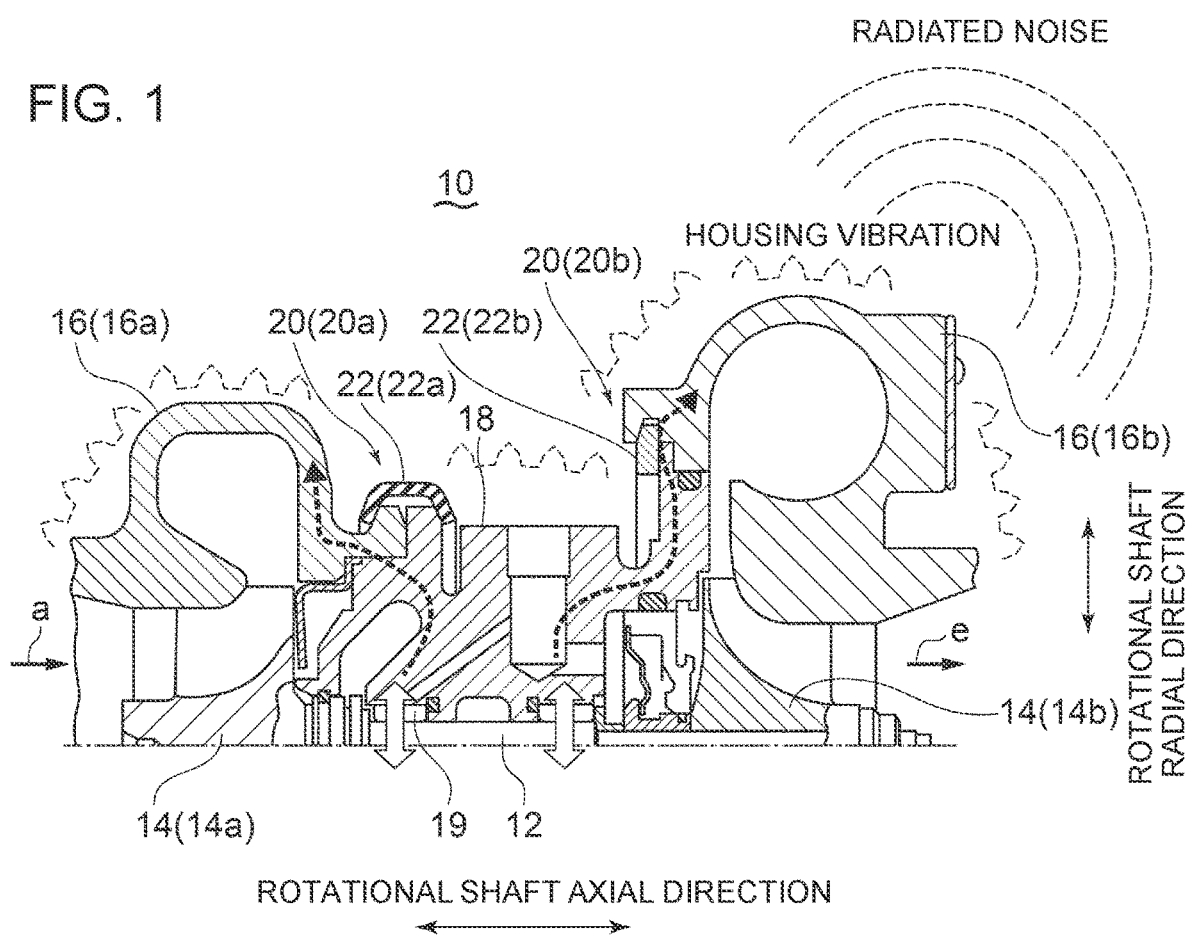
FIG. 1 is a front cross-sectional view of a turbocharger according to an embodiment.
Figure 2:
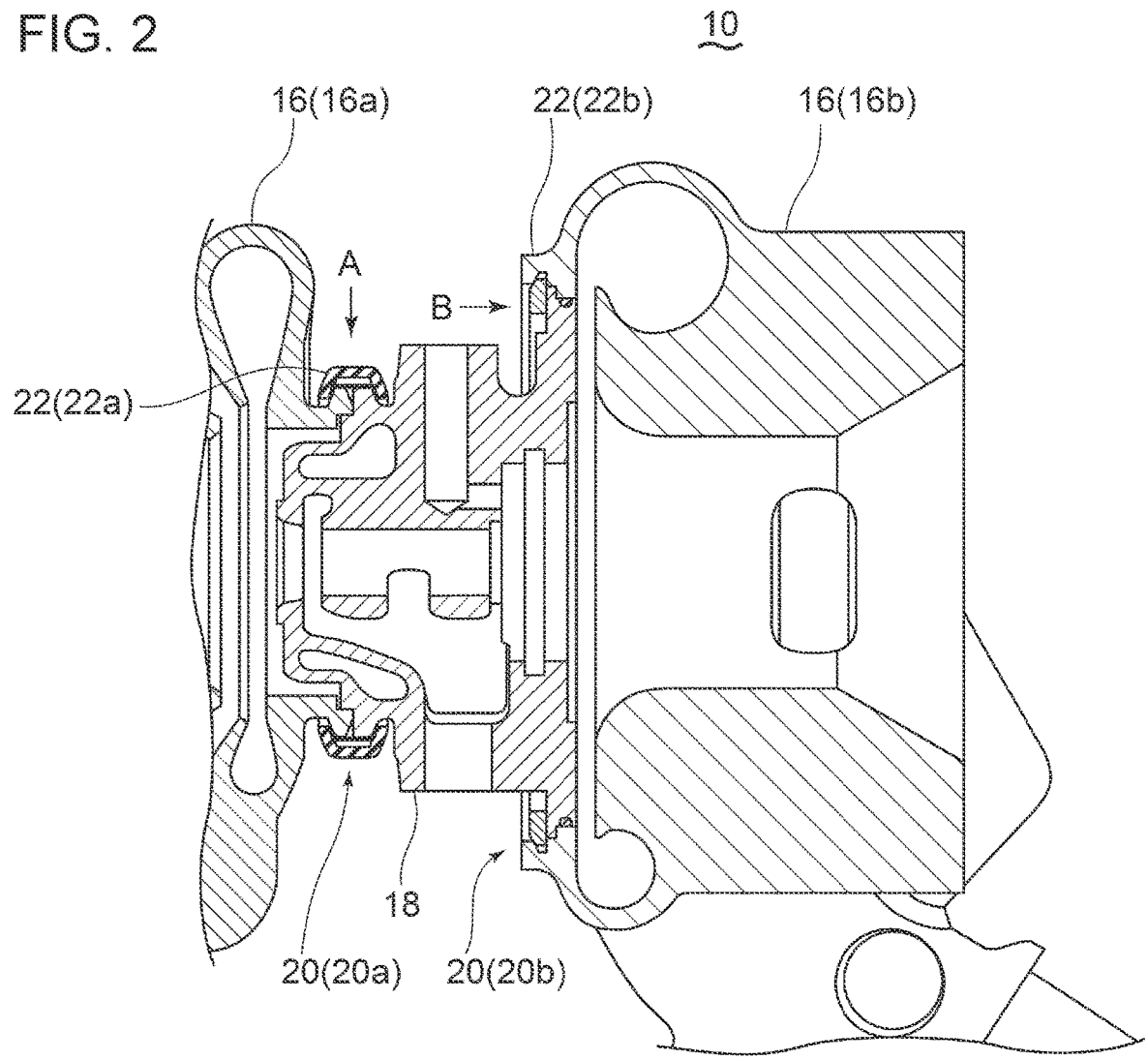
FIG. 2 is a front cross-sectional view of a part of a turbocharger according to an embodiment.

As shown in FIG. 1, a rotary machine 10 includes a rotational shaft 12, an impeller 14 (14a, 14b) mounted to the rotational shaft 12, an impeller housing 16 (16a, 16b) accommodating the impeller 14 (14a, 14b), and a bearing housing 18. The bearing housing 18 accommodates a bearing 19 that supports the rotational shaft 12 rotatably, and is coupled to the impeller housing 16. The impeller housing 16 and the bearing housing 18 are fastened in the axial direction of the rotational shaft 12 by a fastening member 20 (20a, 20b, 20c). That is, the fastening member 20 (20a, 20b, 20c) applies a fastening force along the axial direction of the rotational shaft 12 to the impeller housing 16 and the bearing housing 18.

In the depicted embodiment, the rotary machine 10 is a turbocharger to be mounted to an automobile or the like, where the compressor impeller 14 (14a) and the turbine impeller 14 (14b) are mounted to both end regions of the rotational shaft 12. The compressor impeller 14 (14a) is housed in the compressor housing 16 (16a), and the turbine impeller 14 (14b) is housed in the turbine housing 16 (16b).

The bearing housing 18 is disposed between the above housings. The compressor housing 16 (16a) and the bearing housing 18 are fastened in the axial direction by a coupling 22 (22a), and the turbine housing 16 (16b) and the bearing housing 18 are fastened in the axial direction by a snap ring 22 (22b).

In the depicted embodiment, exhaust gas 'e' discharged from the engine (not shown) passes through the turbine housing 16 (16b) and rotates the turbine impeller 14 (14b). The supply air 'a' is taken into the compressor housing 16 (16a) by the compressor impeller 14 (14a) in rotation, and is compressed in the compressor housing 16 (16a) before being sent to the engine.

During rotation of the rotary machine 10, vibration of the rotational shaft 12 transfers to each housing as shown by the arrow, which may cause vibration of each housing and raise a risk of generation of radiated noise.

As shown in FIGS. 2 to 7, in some embodiments, at the fastening part 20 (20a, 20b, 20c, 20d) where a fastening force is applied in the axial direction of the rotational shaft by the fastening member 22 (22a, 22b, 22c, 22d), the impeller housing 16 has an impeller-housing side contact surface 24 (24a, 24b) extending in a direction which intersects with the axial direction of the rotational shaft 12. The impeller-housing side contact surface 24 includes an impeller-housing side first contact surface 24(24a) which is in contact with the fastening member 22, and an impeller-housing side second contact surface 24 (24b) which is in contact with the bearing housing 18.

At the fastening part 20, the bearing housing 18 has a bearing-housing side contact surface 26 (26a, 26b) extending in a direction which intersects with the axial direction of the rotational shaft 12. The bearing-housing side contact surface 26 includes a bearing-housing side first contact surface 26 (26a) which is in contact with the fastening member 22, and a bearing-housing side second contact surface 26 (26b) which is in contact with the impeller housing 16.

The fastening member 22 has a fastening-member side contact surface 28 (28a, 28b) extending in a direction which intersects with the axial direction of the rotational shaft 12. The fastening-member side contact surface 28 includes a fastening-member side first contact surface 28 (28a) which is in contact with the impeller housing 16, and a fastening-member side second contact surface 28 (28b) which is in contact with the bearing housing 18.

Further, a thin-plate member 30 (30a, 30b, 30c, 30d) is interposed between at least one location between the impeller-housing side first contact surface 24 (24a) and the fastening-member side first contact surface 28 (28a), between the bearing-housing side first contact surface 26 (26a) and the fastening-member side second contact surface 28 (28b), or between the impeller-housing side second contact surface 24 (24b) and the bearing-housing side second contact surface 26 (26b). The thin-plate member 30 is formed separately from the impeller housing 16, the bearing housing 18, and the fastening member 22.

As the above thin-plate member 30, although not particularly limited, a metal or heat-resistant resin plate-shaped member having a thickness of 0.1 mm to 2.0 mm, or preferably, 0.5 mm to 1.0 mm may be used.

With the above configuration, the thin-plate member 30 is interposed between the two contact surfaces formed by the impeller housing 16, the bearing housing 18, and the fastening member 22, and thereby a contact part increases between the two contact surfaces, which leads to generation of small relative vibration (micro-vibration in a direction along the contact surfaces) between the two contact surfaces. Accordingly, friction occurs between the two contact surfaces, and the friction damping effect attenuates the shaft vibration from the rotational shaft 12, and thus it is possible to suppress vibration and noise that occur in the rotary machine 10.

Further, vibration of the rotational shaft 12 that may cause vibration in the rotary machine 10 is due to weight unbalance of the rotational shaft 12, for instance. Thus, if it is possible to suppress vibration of the rotary machine 10 with the above configuration, it is possible to set a higher unbalance allowance value for the rotational shaft 12, and improve production yield of the rotational shaft 12.

In the turbocharger according to the embodiment shown in FIG. 1, the fastening force between the impeller housing 16, the bearing housing 18, and the fastening member 22 is not as strong in the radial direction of the rotational shaft as in the axial direction of the rotational shaft. Thus, between the two contact surfaces where the thin-plate member 30 is interposed, position displacement in the radial direction of the rotational shaft tends to occur relatively easily, and the position displacement generates a friction force that enhances the vibration damping effect of the turbocharger.

Figure 3:
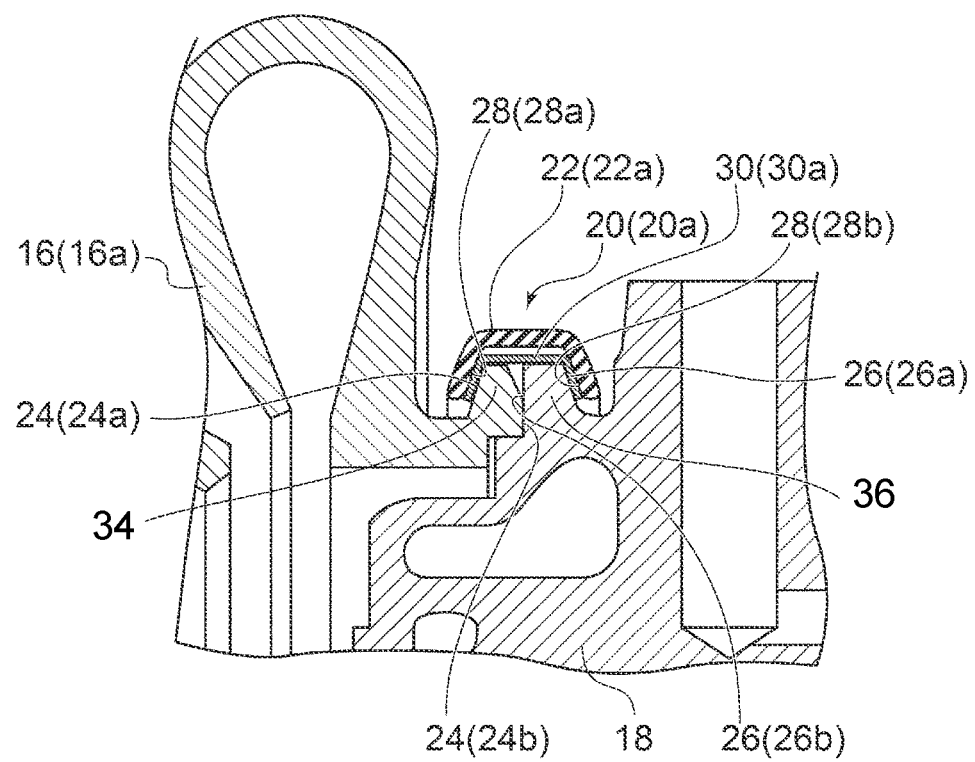
FIG. 3 is an enlarged cross-sectional view of a part of a turbocharger according to an embodiment (corresponding to the part A in FIG. 2).

In an embodiment, as shown in FIG. 3, the impeller housing 16 has an impeller-housing side flange portion 34 extending outward in the radial direction of the rotational shaft 12, and the bearing housing 18 has a bearing-housing side flange portion 36 extending outward in the radial direction of the rotational shaft 12. The bearing-housing side flange portion 36 is in contact with the impeller-housing side flange portion 34.

The impeller-housing side second contact surface 24 (24b) is formed on the impeller-housing side flange portion 34, and the bearing-housing side second contact surface 26 (26b) is formed on the bearing-housing side flange portion 36.

The fastening member 22 (22a) is a coupling that nips the impeller-housing side flange portion 34 and the bearing-housing side flange portion 36.

Further, the impeller-housing side first contact surface 24 (24a), the impeller-housing side second contact surface 24 (24b), the bearing-housing side first contact surface 26 (26a), the bearing-housing side second contact surface 26 (26b), the fastening-member side first contact surface 28 (28a), and the fastening-member side second contact surface 28 (28b) extend in a direction that intersects with the direction of the rotational shaft.

With the above configuration, in a rotary machine where the fastening member 22 (22a) is a coupling that nips the impeller-housing side flange portion 34 and the bearing-housing side flange portion 36, it is possible to suppress vibration and noise that occur in the rotary machine 10.

Further, for the above two contact surfaces that exist in the existing fastening part 20 (20a) are utilized, there is no need to modify the rotary machine 10.

In the depicted embodiment, the impeller-housing side flange portion 34 is a flange portion formed on the turbine housing 16 (16b), and the fastening member 22 (22a) is an annular coupling member (V coupling), having both side portions curved in a lateral cross-sectional view. The curved portions nip and hold together the impeller-housing side flange portion 34 and the bearing-housing side flange portion 36.

The impeller-housing side second contact surface 24 (24b) and the bearing-housing side second contact surface 26 (26b) extend along the radial direction of the rotational shaft. Thus, as described above, it is possible to enhance the vibration damping effect of the rotary machine 10 with position displacement in the radial direction of the rotational shaft.

In an embodiment, as shown in FIG. 3, the thin-plate member 30 (30a) is formed by a single thin-plate member, and is interposed between the impeller-housing side first contact surface 24 (24a) and the fastening-member side first contact surface 28 (28a), and between the bearing-housing side second contact surface 26 (26a) and the fastening-member side second contact surface 28 (28b).

Accordingly, in addition to the above effect, with the thin-plate member 30 (30a) interposed between the two contact surfaces to which a pressing force is applied by the coupling 22 (22a), it is possible to improve the vibration damping effect. Furthermore, with the thin-plate member 30 (30a) being formed by a single thin-plate member, the thin-plate member 30 (30a) can be produced readily, and can be interposed readily between the two contact surfaces.

In the depicted embodiment, the thin-plate member 30 (30a) has an annular shape, and has a shape where both sides are curved so as to surround the impeller-housing side flange portion 34 and the bearing-housing side flange portion 36, along the inner side surface of the fastening member 22 (22a) in a lateral cross section. Accordingly, the thin-plate member 30 (30a) can be readily placed in a small space between the fastening member 22 (22a) and the impeller-housing side flange portion 34 and the bearing-housing side flange portion 36.

Figure 4:
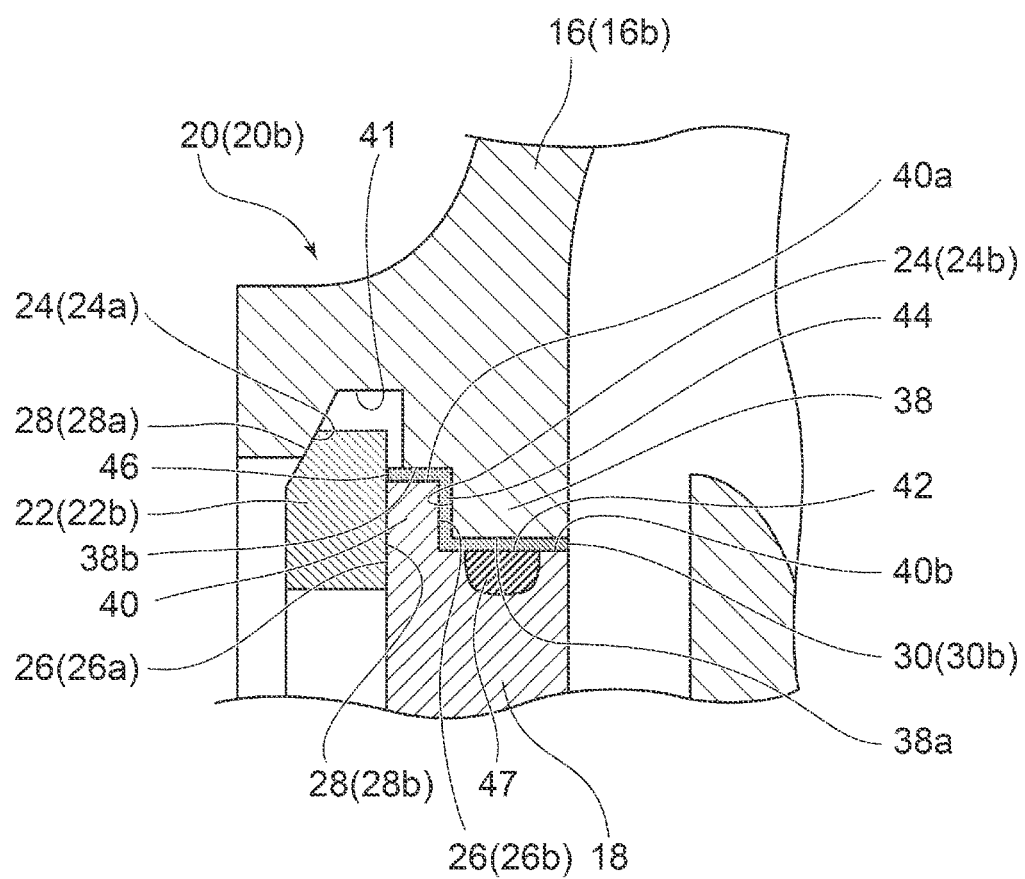
FIG. 4 is an enlarged cross-sectional view of a part of a turbocharger according to an embodiment (corresponding to the part B in FIG. 2).

In an embodiment, as shown in FIG. 4, the impeller housing 16 has an impeller-housing side protruding portion 38 extending inward in the radial direction of the rotational shaft 12, and the bearing housing 18 has a bearing-housing side protruding portion 40 extending outward in the radial direction of the rotational shaft 12. The bearing-housing side protruding portion 40 is in contact with the impeller-housing side protruding portion 38.

The impeller-housing side second contact surface 24 (24b) is formed on the impeller-housing side protruding portion 38, and the bearing-housing side second contact surface 26 (26b) is formed on the bearing-housing side protruding portion 40.

Further, the fastening member 22 (22b) is formed by a snap ring, and the outer peripheral portion of the snap ring is fitted into an annular groove 41 formed on the inner peripheral surface of the impeller housing 16. The bearing-housing side second contact surface 26 (26b) is biased toward the impeller-housing side second contact surface 24 (24b) by the snap ring 22 (22b).

With the above configuration, in the rotary machine 10 where the fastening member 22 (22b) is a snap ring configured to bias the bearing-housing side second contact surface 26 (26b) toward the impeller-housing side second contact surface 24 (24b), it is possible to suppress vibration and noise that occur in the rotary machine 10.

Further, for the above two contact surfaces that exist in the existing fastening part 20 (20b) are utilized, there is no need to modify the rotary machine 10.

In an embodiment, as shown in FIG. 4, the thin-plate member 30 (30a) is interposed between the impeller-housing side second contact surface 24 (24b) and the bearing-housing side second contact surface 26 (26b).

With the above configuration, in addition to the above effect, with the thin-plate member 30 (30b) interposed between the two contact surfaces to which a pressing force is applied by the snap ring 22 (22b), it is possible to improve the vibration damping effect of the rotary machine 10.

In the depicted embodiment, the two contact surfaces extend along the radial direction of the rotational shaft, and thus, as described above, it is possible to enhance the vibration damping effect of the rotary machine 10 with position displacement in the radial direction of the rotational shaft.

In the depicted embodiment, as shown in FIG. 4, the impeller housing 16 is a turbine housing 16 (16b), and the impeller-housing side protruding portion 38 is formed on the turbine housing 16 (16b).

A tip surface 38a of the impeller-housing side protruding portion 38 and an end surface 38b of the turbine housing 16 (16b) other than the tip surface 38a form an annular stepped surface which extends along the axial direction of the rotational shaft and which has a varying distance from the rotational shaft 12. Further, a tip surface 40a of the bearing-housing side protruding portion 40 and an end surface 40b of the bearing housing 18 other than the tip surface 40a form an annular stepped surface which extends along the axial direction of the rotational shaft and which has a varying distance from the rotational shaft 12.

Further, the thin-plate member 30 (30b) includes a first annular portion 42 interposed between the tip surface 38a and the end surface 40b and extending in the axial direction of the rotational shaft 12, a disc portion 44 interposed between the impeller-housing side second contact surface 24 (24b) and the bearing-housing side second contact surface 26 (26b) and extending in the radial direction of the rotational shaft 12, and a second annular portion 46 interposed between the tip surface 40a and the end surface 38b. Furthermore, a seal member 47 is interposed between the first annular portion 42 and the bearing housing 18.

With the above configuration, the contact surface part between the thin-plate member 30 (30b), the impeller-housing side second contact surface 24 (24b), and the bearing-housing side second contact surface 26 (26b) increases, and the friction force between the contact surfaces also increases. Accordingly, it is possible to improve the vibration damping effect of the rotary machine 10.

Figure 5:
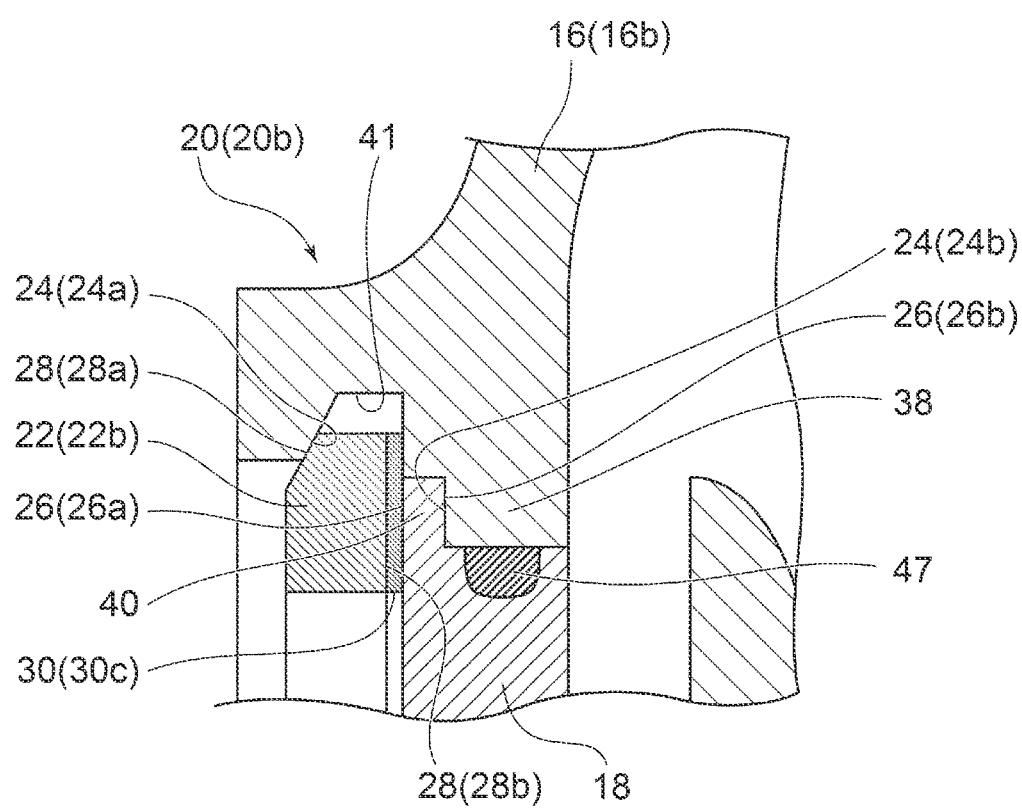
FIG. 5 is an enlarged cross-sectional view of a part of a turbocharger according to an embodiment (corresponding to the part B in FIG. 2).

In an embodiment, as shown in FIG. 5, the thin-plate member 30 (30a) is interposed between the fastening-member side second contact surface 28 (28b) and the bearing-housing side first contact surface 26 (26a).

With the above configuration, with the thin-plate member 30 (30c) interposed between the two contact surfaces to which a pressing force is applied by the snap ring 22 (22b), it is possible to improve the vibration damping effect of the rotary machine 10. Further, for the thin-plate member 30 (30c) is disposed between the above two contact surfaces that exist in the existing fastening part 20 (20c), there is no need to modify the rotary machine 10.

In the depicted embodiment, the fastening-member side second contact surface 28 (28b) and the bearing-housing side second contact surface 26 (26b) extend along the axial direction of the rotational shaft, and the thin-plate member 30 (30c) is disposed along the radial direction of the rotational shaft 12 and has a disc shape extending in the circumferential direction of the rotational shaft 12. Thus, between the fastening-member side second contact surface 28 (28b) and the bearing-housing side first contact surface 26 (26a), relative position displacement is likely to occur in the radial direction of the rotational shaft during operation of the rotary machine 10, and thereby the friction force between the two contact surfaces increases, whereby it is possible to improve the vibration damping effect of the rotary machine 10. Further, the thin-plate member 30 (30c) has a simple shape, and thus can be produced at a low cost.

Figure 6:
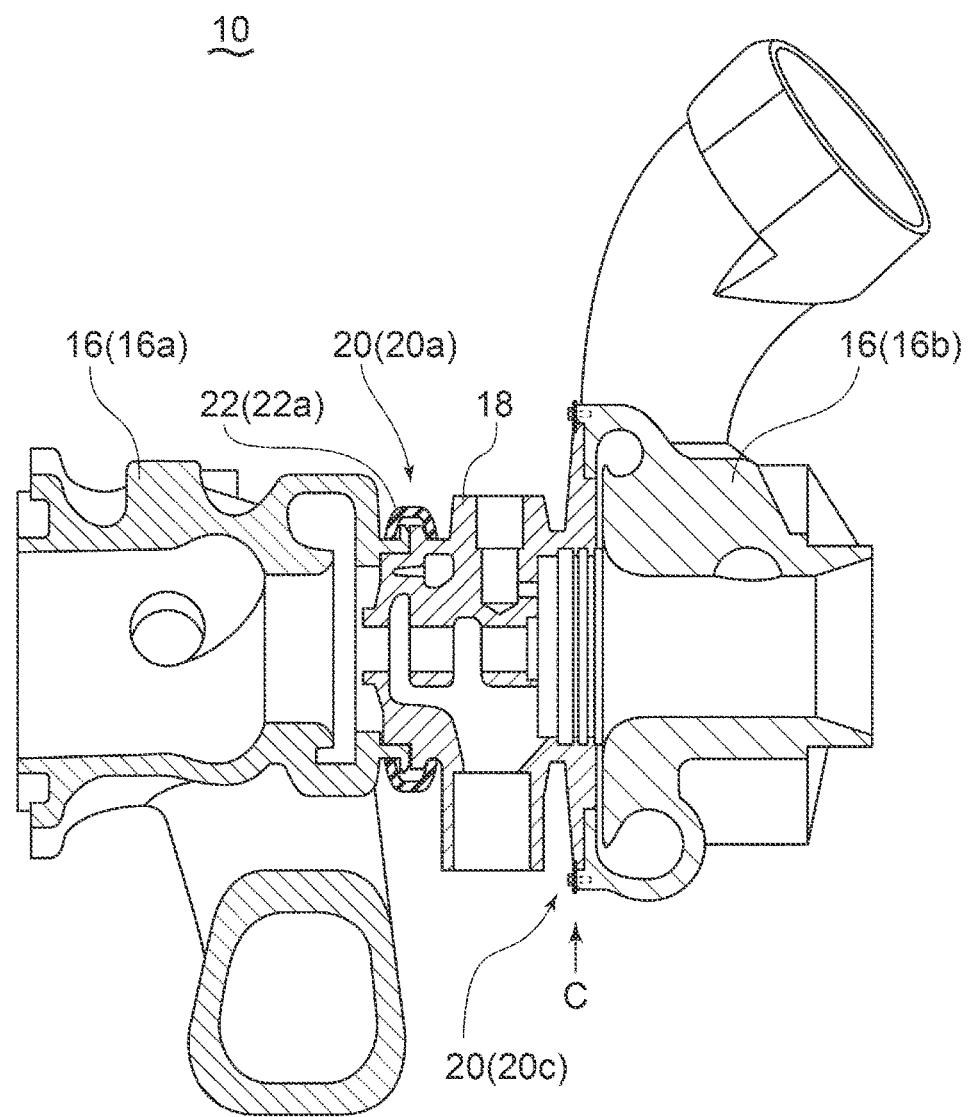
FIG. 6 is a front cross-sectional view of a part of a turbocharger according to an embodiment.
Figure 7:
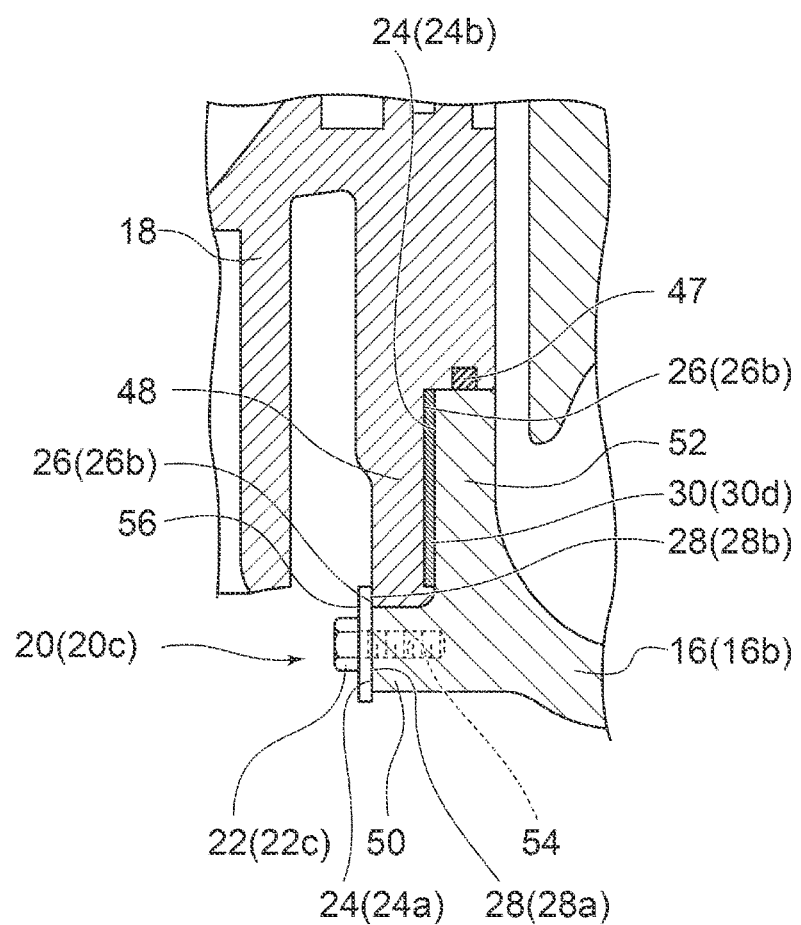
FIG. 7 is an enlarged cross-sectional view of a part of a turbocharger according to an embodiment (corresponding to the part C in FIG. 6).

In an embodiment, as shown in FIGS. 6 and 7, the bearing housing 18 has a bearing-housing side extension portion 48 extending outward in the radial direction of the rotational shaft 12. The impeller housing 16 includes an impeller-housing side bolt receiving portion 50 disposed on the outer side of the bearing-housing side extension portion 48 with respect to the radial direction of the rotational shaft 12, and an impeller-housing side extension portion 52 which is in contact with the bearing-housing side extension portion 48 and which extends inward in the radial direction of the rotational shaft 12 from the impeller-housing side bolt receiving portion 50.

The impeller-housing side second contact surface 24 (24b) is formed on the impeller-housing side extension portion 52, and the bearing-housing side second contact surface 26 (26b) is formed on the bearing-housing side extension portion 48. The impeller-housing side second contact surface 24 (24b) and the bearing-housing side second contact surface 26 (26b) extend along a direction that intersects with the axial direction of the rotational shaft.

Further, the fastening member 22 (22c) is a bolt to be screwed into a screw hole 54 formed on the impeller-housing side bolt receiving portion 50. The bolt 22 (22c) is configured to bias the bearing-housing side second contact surface 26 (26b) toward the impeller-housing side second contact surface 24 (24b) by being screwed into the screw hole 54.

With the above configuration, in the rotary machine 10 where the fastening member 22 (22c) is a bolt configured to bias the bearing-housing side second contact surface 26 (26b) toward the impeller-housing side second contact surface 24 (24b), it is possible to suppress vibration and noise that occur in the rotary machine 10.

Further, for the above two contact surfaces that exist in the existing fastening part 20 (20d) are utilized, there is no need to modify the rotary machine 10.

In an embodiment, as shown in FIG. 7, the thin-plate member 30 (30d) is interposed between the impeller-housing side second contact surface 24 (24b) and the bearing-housing side second contact surface 26 (26b).

With the above configuration, with the thin-plate member 30 (30d) interposed between the two contact surfaces to which a pressing force is applied by the bolt 22 (22c), it is possible to improve the vibration damping effect of the rotary machine 10.

In the depicted embodiment, the impeller-housing side second contact surface 24 (24b) and the bearing-housing side second contact surface 26 (26b) extend along the radial direction of the rotational shaft. Thus, position displacement easily occurs between the above contact surfaces during operation of the rotary machine 10, which increases the friction force, and it is possible to enhance the vibration damping effect of the rotary machine 10.

Further, a washer 56 is interposed between a head of the bolt 22 (22c) and the impeller-housing side bolt receiving portion 50, and configured to apply a biasing force to bias the bearing-housing side extension portion 48 to the impeller-housing side extension portion 52. Accordingly, it is possible to enhance the biasing force against the bearing-housing side second contact surface 26 (26b), and to increase the friction force generated between the impeller-housing side first contact surface 24 (24a) and the bearing-housing side second contact surface 26 (26b).

Further, the biasing force may be applied to the bearing-housing side extension portion 48 only with the head of the bolt 22 (22c), without using the washer 56.

In some embodiments, in the rotary machine 10 shown in FIGS. 2 to 7, at least one of the impeller-housing side first contact surface 24 (24a), the impeller-housing side second contact surface 24 (24b), the bearing-housing side first contact surface 26 (26a), the bearing-housing side second contact surface 26 (26b), the fastening-member side first contact surface 28 (28a), or the fastening-member side second contact surface 28 (28b) has at least one recess portion 32 (32a, 32b, 32c) as shown in FIG. 8.

With the above configuration, with at least one of the two contact surfaces having the recess portion 32, the contact part between the thin-plate member 30 and the contact surfaces decreases, and thereby slight backlash (micro-vibration in a direction intersecting with the contact surfaces) is more likely to occur between the thin-plate member 30 and the contact surfaces. When the slight backlash occurs between the contact surfaces, the shaft vibration from the rotational shaft 12 is attenuated by a collision damping effect. Accordingly, it is possible to suppress vibration and noise that occur in the rotary machine 10 even further.

In some embodiments, as shown in FIG. 8, the recess portion 32 formed on at least one of the two contact surfaces includes a plurality of recess portions 32 disposed at intervals in the circumferential direction of the rotational shaft 12.

With the above configuration, it is possible to improve the effect to attenuate vibration even further, with the collision damping effect exerted by the plurality of recess portions 32 formed in the circumferential direction of the rotational shaft 12.

Figure 8A:
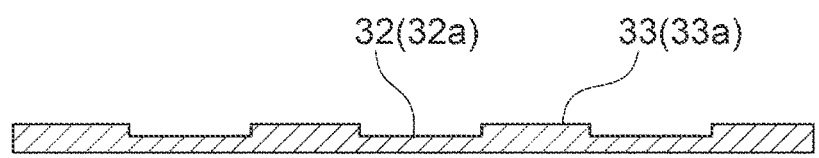
FIGS. 8A, 8B, 8C are each a cross-sectional view of a recess portion according to some embodiments.

In an embodiment, as shown in FIG. 8A, the recess portion 32 (32a) includes a plurality of recess portions each having a flat surface, formed at regular intervals in the circumferential direction of the rotational shaft 12. Between the recess portions 32 (32a), protruding portions 33 (33a) are formed, each having a flat surface.

Figure 8B:
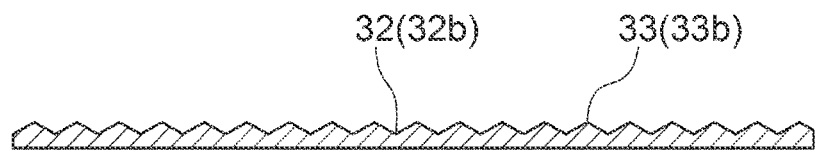

In another embodiment shown in FIG. 8B, recess portions 32 (32b) are formed at regular intervals between protruding portions 33 (33b) formed to have a wavy cross section.

Figure 8C:
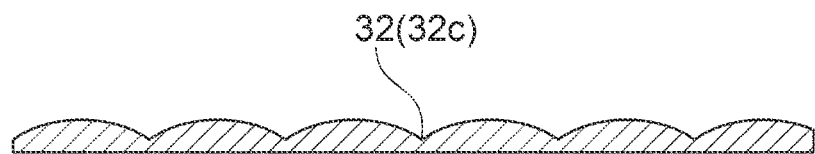

In yet another embodiment shown in the cross-sectional view of FIG. 8C, recess portions 32 (32c) are formed at regular intervals between a plurality of arcs formed at regular intervals.

In some embodiments, in the rotary machine 10 shown in FIGS. 2 to 7, the thin-plate member 30 is interposed between at least one location between the impeller-housing side first contact surface 24 (24a) and the fastening-member side first contact surface 28 (28a), between the bearing-housing side first contact surface 26(26a) and the fastening-member side second contact surface 28 (28b), or between the impeller-housing side second contact surface 24 (24b) and the bearing-housing side second contact surface 26 (26b). Further, the recess portions 32 as shown in FIGS. 8A to 8C are formed on at least one of the two contact surfaces between which the thin-plate member 30 is interposed.

With the above configuration, the recess portions 32 are formed on at least one of the two contact surfaces between which the thin-plate member 30 is interposed, and thereby it is possible to further improve the effect to attenuate vibration, with the friction damping effect from friction generated between the thin-plate member 30 and the contact surfaces, and the synergistic effect of the friction damping effect and the collision damping effect achieved by providing the recess portions 32.

In some embodiments, as shown in FIG. 1, the rotary machine 10 includes a rotational shaft 12, an impeller 14 (14a, 14b) mounted to the rotational shaft 12, an impeller housing 16 (16a, 16b) accommodating the impeller 14 (14a, 14b), and a bearing housing 18. The bearing housing 18 accommodates a bearing 19 that supports the rotational shaft 12 rotatably, and is coupled to the impeller housing 16. The impeller housing 16 and the bearing housing 18 are fastened in the axial direction of the rotational shaft 12 by a fastening member 20 (20a, 20b, 20c).

Figure 9:
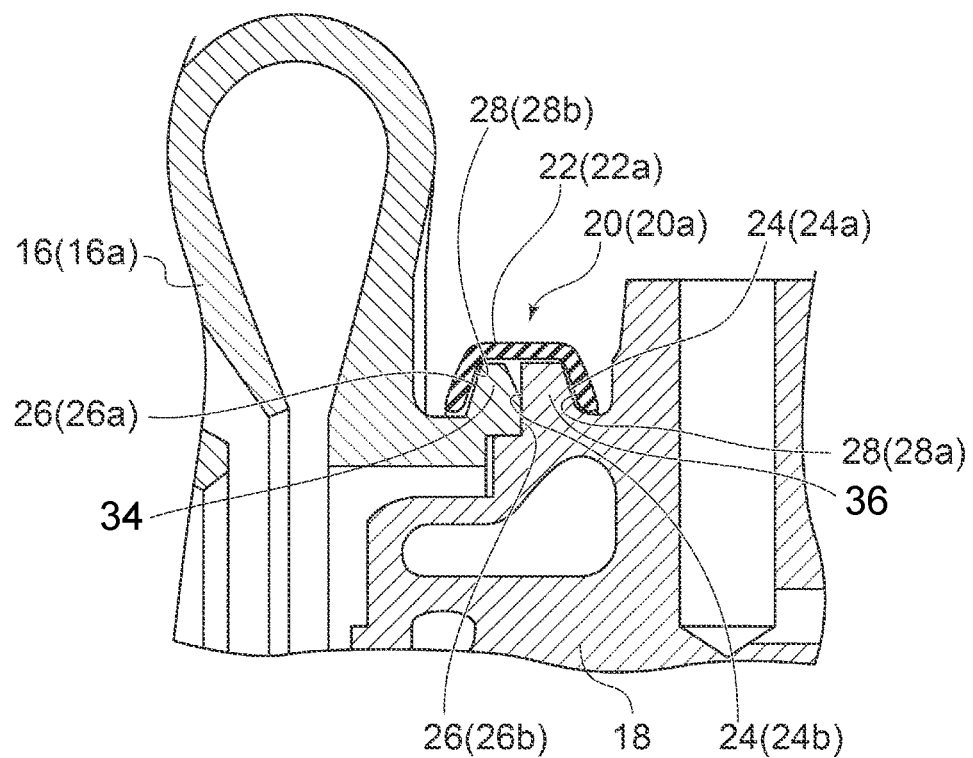
FIG. 9 is a front cross-sectional view of a part of a turbocharger according to an embodiment.
Figure 10A:
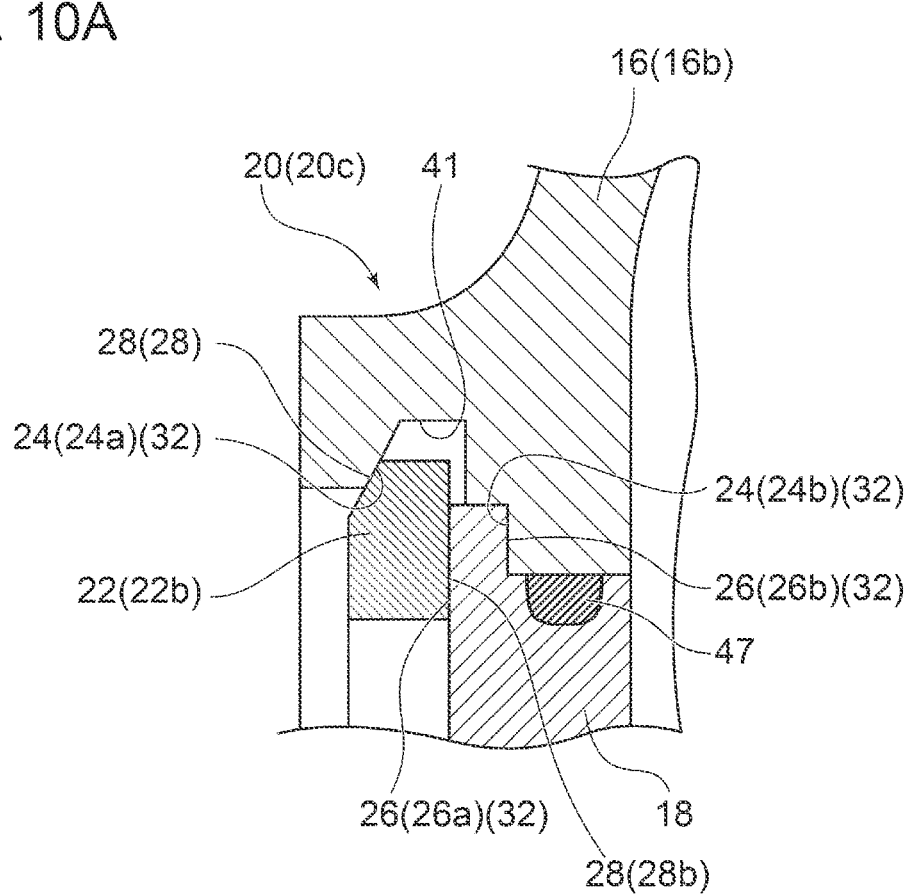
FIG. 10 is an enlarged cross-sectional view of a part of a turbocharger according to an embodiment (corresponding to the part A in FIG. 2).
Figure 10B:
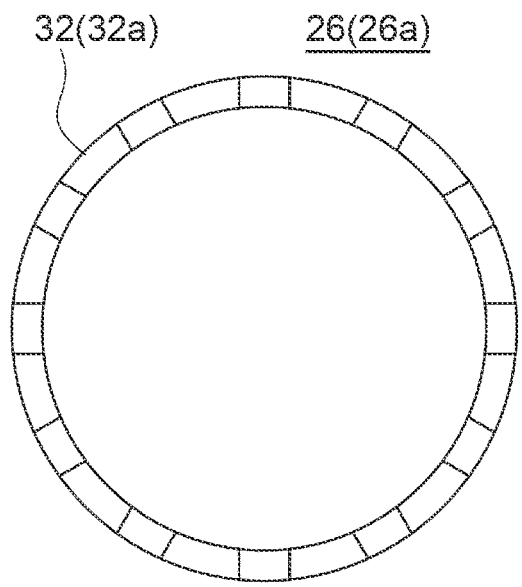
Figure 11:
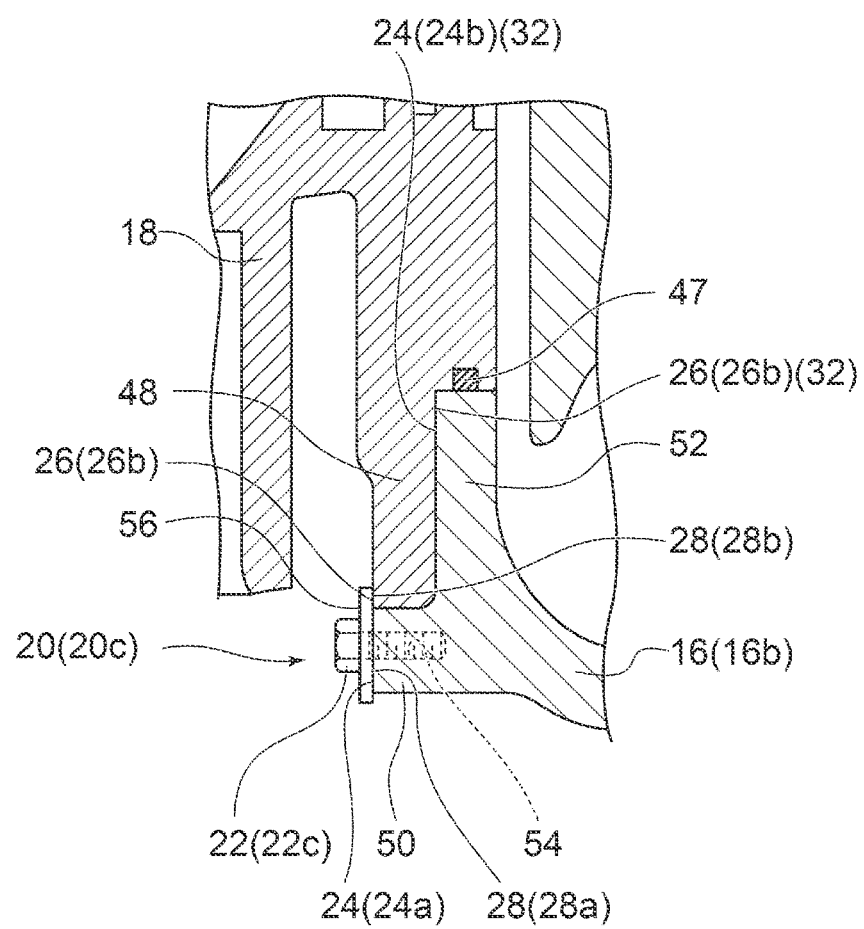
FIG. 11 is an enlarged cross-sectional view of a part of a turbocharger according to an embodiment (corresponding to the part B in FIG. 2).

As shown in FIGS. 9 to 11, in some embodiments, at the fastening part 20 where a fastening force is applied in the direction of the rotational shaft by the fastening member 22, the impeller housing 16 has an impeller-housing side contact surface 24 (24a, 24b) extending in a direction which intersects with the axial direction of the rotational shaft 12. The impeller-housing side contact surface 24 includes an impeller-housing side first contact surface 24 (24a) which is in contact with the fastening member 22, and an impeller-housing side second contact surface 24 (24b) which is in contact with the bearing housing 18.

At the fastening part 20, the bearing housing 18 has a bearing-housing side contact surface 26 (26a, 26b) extending in a direction which intersects with the axial direction of the rotational shaft 12. The bearing-housing side contact surface 26 includes a bearing-housing side first contact surface 26(26a) which is in contact with the fastening member 22, and a bearing-housing side second contact surface 26 (26b) which is in contact with the impeller housing 16.

The fastening part 22 has a fastening-member side contact surface 28 (28a, 28b) extending in a direction which intersects with the axial direction of the rotational shaft 12. The fastening-member side contact surface 28 includes a fastening-member side first contact surface 28 (28a) which is in contact with the impeller housing 16, and a fastening-member side second contact surface 28 (28b) which is in contact with the bearing housing 18.

Further, as shown FIGS. 9 to 11, at least one of the impeller-housing side first contact surface 24 (24a), the impeller-housing side second contact surface 24 (24b), the bearing-housing side first contact surface 26 (26a), the bearing-housing side second contact surface 26 (26b), the fastening-member side first contact surface 28 (28a), or the fastening-member side second contact surface 28 (28b) has at least one recess portion 32 (32a, 32b, 32c).

With the above configuration, at least one recess portion 32 is disposed on at least one of the two contact surfaces formed by the impeller housing 16, the bearing housing 18, and the fastening member 22, and thereby small relative vibration (micro-vibration in a direction along the contact surfaces) and small backlash (micro-vibration in a direction intersecting with the contact surfaces) are more likely to occur between the two contact surfaces. When the micro relative vibration occurs between the contact surfaces, friction occurs between the two contact surfaces, and the shaft vibration from the rotational shaft 12 is attenuated by a friction damping effect. When the slight backlash occurs between the contact surfaces, the shaft vibration from the rotational shaft 12 is attenuated by a collision damping effect. Accordingly, it is possible to suppress vibration and noise that occur in the rotary machine 10 even further.

Further, vibration of the rotational shaft 12 that may cause vibration generation in the rotary machine 10 is due to weight unbalance of the rotational shaft 12, for instance. Thus, if it is possible to suppress vibration of the rotary machine 10 with the above configuration, it is possible to set a higher unbalance allowance value for the rotational shaft 12, and improve production yield of the rotational shaft 12.

In an embodiment, as shown in FIG. 9, the fastening member 22 (22a) is a coupling that nips the impeller-housing side flange portion 34 and the bearing-housing side flange portion 36. In this embodiment, at least one of the impeller-housing side first contact surface 24 (24a), the impeller-housing side second contact surface 24 (24b), the bearing-housing side first contact surface 26 (26a), the bearing-housing side second contact surface 26 (26b), the fastening-member side first contact surface 28 (28a), or the fastening-member side second contact surface 28 (28b) has at least one recess portion 32.

With the above configuration, in a rotary machine where the fastening member 22 (22a) is a coupling that nips the impeller-housing side flange portion 34 and the bearing-housing side flange portion 36, it is possible to suppress vibration and noise that occur in the rotary machine 10.

Furthermore, the recess portions 32 are formed on at least one of the two contact surfaces to which a pressing force is applied by the coupling 20 (20b), and thereby it is possible to improve the vibration damping effect. Further, for the recess portions 32 are formed on the above two contact surfaces that exist in the existing fastening part 20 (20a), there is no need to modify the rotary machine 10.

In an embodiment, as shown in FIG. 10A, the fastening member 22 (22b) is a snap ring that fastens the impeller housing 16 and the bearing housing 18 in the axial direction. In this embodiment, at least one of the impeller-housing side first contact surface 24 (24a), the impeller-housing side second contact surface 24 (24b), the bearing-housing side first contact surface 26 (26a), the bearing-housing side second contact surface 26 (26b), the fastening-member side first contact surface 28 (28a), or the fastening-member side second contact surface 28 (28b) has at least one recess portion 32.

With the above configuration, in the rotary machine 10 where the fastening member 22 (22a) is a snap ring configured to bias the bearing-housing side second contact surface 26 (26b) toward the impeller-housing side second contact surface 24 (24b), it is possible to suppress vibration and noise that occur in the rotary machine 10.

Furthermore, the recess portions 32 are formed on at least one of the two contact surfaces to which a pressing force is applied by the snap ring 22 (22b), and thereby it is possible to improve the vibration damping effect.

Further, for the recess portions 32 are formed on the above two contact surfaces that exist in the existing fastening part 20 (20b), there is no need to modify the rotary machine 10.

In the depicted embodiment, the impeller housing 16 is a turbine housing 16 (16b), and the recess portions 32 are formed on the impeller-housing side first contact surface 24 (24a), the impeller-housing side second contact surface 24 (24b), and the bearing-housing side first contact surface 26 (26a).

FIG. 10B shows an example where a plurality of recess portions 32 (32a) are formed on the bearing-housing side first contact surface 26 (26a) at intervals in the circumferential direction of the rotational shaft 12.

Accordingly, with the recess portions 32 (32a) formed on three contact surfaces at the fastening part 20 (20c), it is possible to improve the effect to attenuate vibration of the rotary machine 10.

In an embodiment, as shown in FIG. 11, the bearing housing 18 has a bearing-housing side extension portion 48 extending outward in the radial direction of the rotational shaft. The impeller housing 16 includes an impeller-housing side bolt receiving portion 50 disposed on the outer side of the bearing-housing side extension portion 48 with respect to the radial direction of the rotational shaft, and an impeller-housing side extension portion 52 which is in contact with the bearing-housing side extension portion 48 and which extends inward in the radial direction of the rotational shaft from the impeller-housing side bolt receiving portion 50.

The impeller-housing side second contact surface 24 (24b) is formed with the impeller-housing side extension portion 52, and the bearing-housing side second contact surface 26 (26b) is formed on the bearing-housing side extension portion 48.

The fastening member 22 (22c) is a bolt to be screwed into the screw hole 54 formed on the impeller-housing side bolt receiving portion 50, and configured to bias the bearing-housing side second contact surface 26 (26b) toward the impeller-housing side second contact surface 24 (24b) by being screwed into the screw hole 54. The recess portions 32 are formed on at least one of the impeller-housing side second contact surface 24 (24b) or the bearing-housing side second contact surface 26 (26b).

With the above configuration, in the rotary machine 10 where the fastening member 22 (22c) is a bolt configured to bias the bearing-housing side second contact surface 26 (26b) toward the impeller-housing side second contact surface 24 (24b), it is possible to suppress vibration and noise that occur in the rotary machine 10.

Furthermore, the recess portions 32 are formed on the two contact surfaces to which a pressing force is applied by the bolt 22 (22c), and thereby it is possible to improve the vibration damping effect.

Further, for the recess portions 32 are formed by making use of the existing contact surfaces that exist in the existing fastening part 22 (22c), there is no need to modify the rotary machine 10.

In some embodiments, as shown in FIG. 8, a plurality of recess portions 32 (32a, 32b, 32c) are formed at intervals in the circumferential direction of the rotational shaft 12.

With the above configuration, it is possible to improve the effect to attenuate vibration even further, with the collision damping effect exerted by the plurality of recess portions 32 formed in the circumferential direction of the rotational shaft 12.

Figure 12:
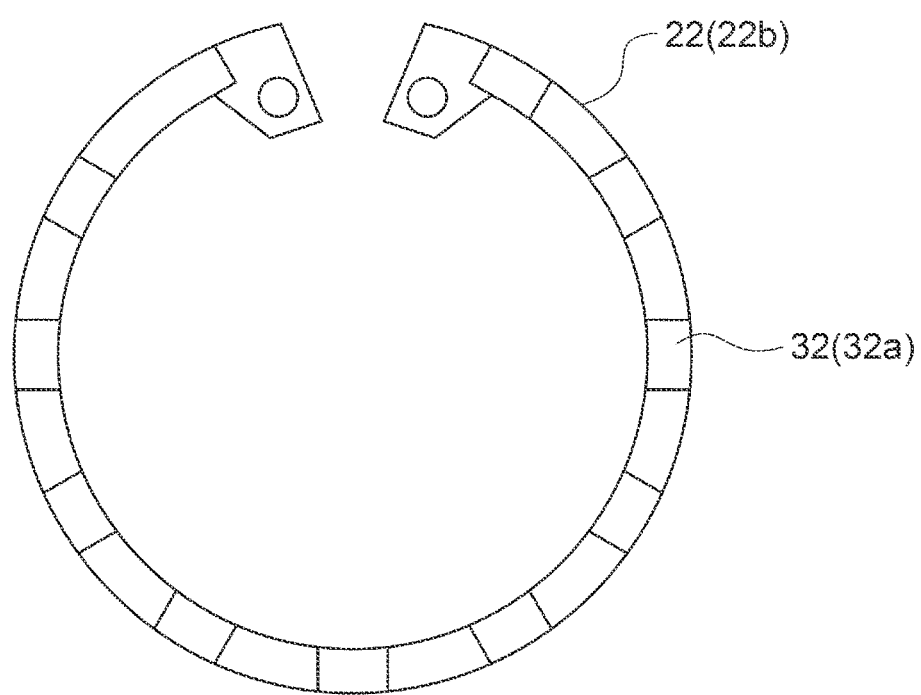
FIG. 12 is a front view of a snap ring (fastening member) according to an embodiment.
Figure 13:
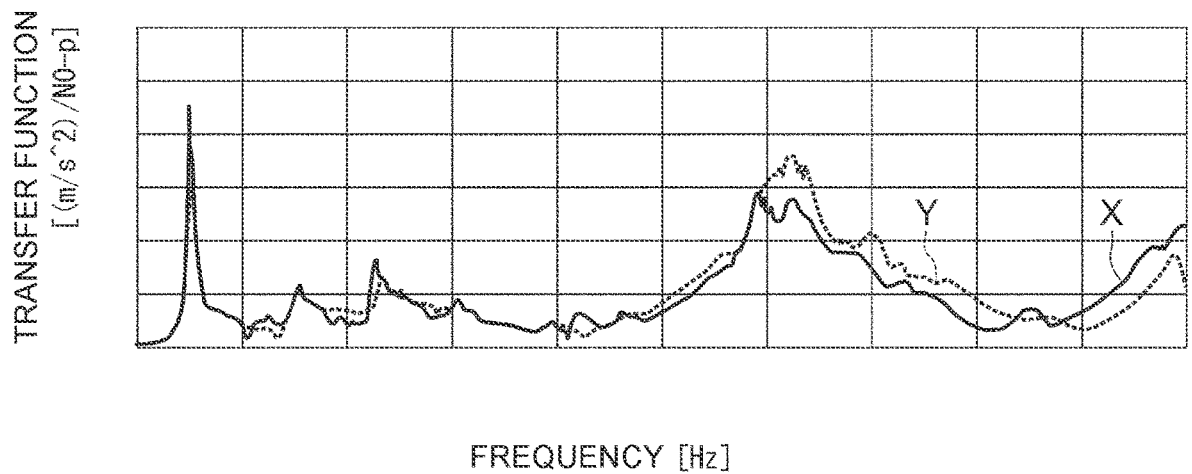
FIG. 13 is a graph showing a noise generation state according to an embodiment.

FIG. 12 shows an example where the fastening member 22 (22b) is a snap ring, and the recess portions 32 (32a) are formed on the fastening-member side second contact surface 28 (28b). FIG. 13 shows a result of measurement of radiated noise for the snap ring 22 (22b) mounted to an automobile turbocharger as shown in FIG. 10. In FIG. 13, the line X represents a case where the snap ring 22 (22b) is used, and the line Y represents a case where the surface of the snap ring 22 (22b) is battered and flattened, as a comparative example.

From the drawings, it is clear that radiated noise is lower in a case where the snap ring 22 (22b) is used shown by the line X, than in a comparative example.

Figure 14:
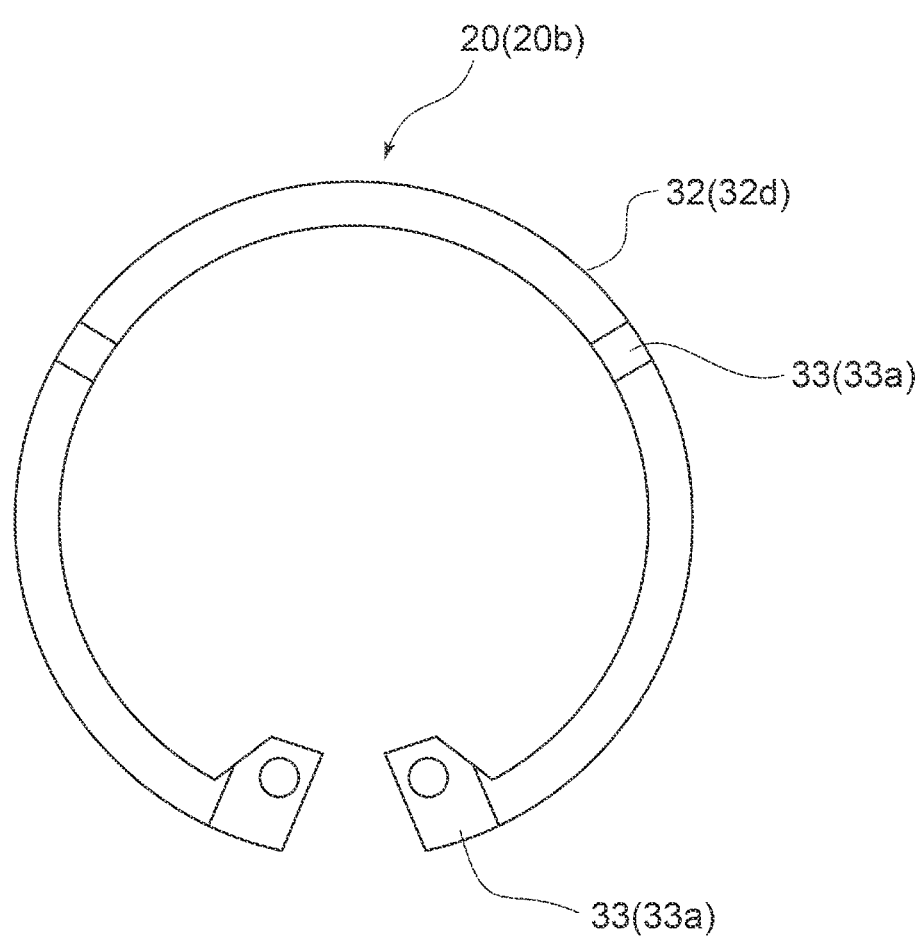
FIG. 14 is a front cross-sectional view of a snap ring (fastening member) according to an embodiment.
Figure 15:
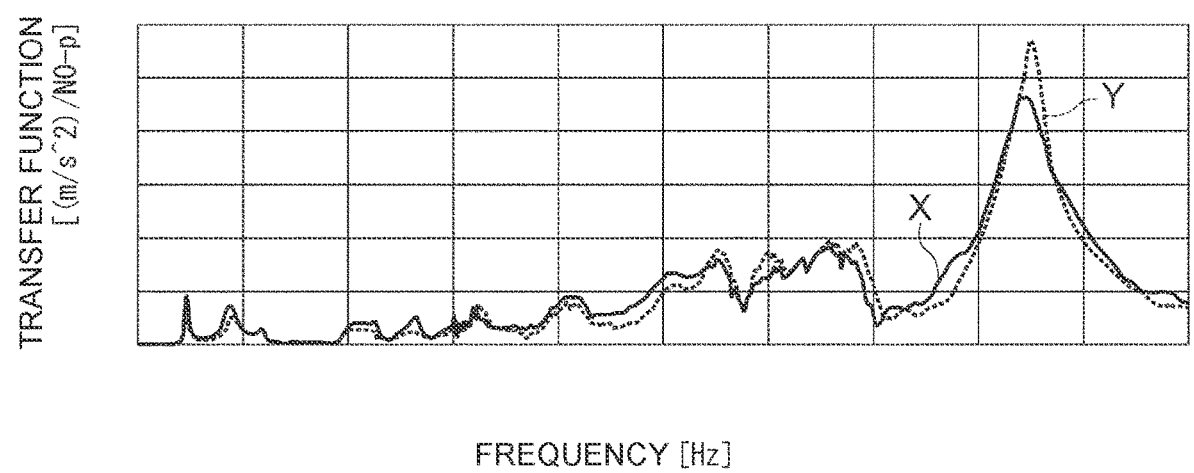
FIG. 15 is a graph showing a noise generation state according to an embodiment.

FIG. 14 shows a snap ring 22 (22b) including protruding portions 33 (33a) formed on four locations on the fastening-member side second contact surface 28 (28b) of the snap ring 22 (22b), and recess portions 32 (32a) each having a flat surface disposed on locations where the protruding portions 33 (33a) are not provided. FIG. 15 shows a result of measurement of radiated noise for the snap ring 22 (22b) mounted to an automobile turbocharger as shown in FIG. 10. In FIG. 15, the line X represents a case where the snap ring 22 (22b) is used, and the line Y represents a case where the snap ring 22 (22b) with the fastening-member side second contact surface 28 (28b) having a flat surface is used, as a comparative example.

From the drawings, it is clear that radiated noise is lower in a case where the snap ring 22 (22b) is used shown by the line X, than in a comparative example.

INDUSTRIAL APPLICABILITY

According to some embodiments, it is possible to suppress vibration and noise that occur in a rotary machine with a simple configuration.

DESCRIPTION OF REFERENCE NUMERALS

10 Rotary machine
12 Rotational shaft
14 (14a, 14b) Impeller
14b Compressor impeller
14b Turbine impeller
16 (16a, 16b) Impeller housing
16a Compressor housing
16b Turbine housing
18 Bearing housing
19 Bearing
20 (20a, 20b, 20c, 20d) Fastening part
22 (22a, 22b, 22c) Fastening member
22a Coupling
22b Snap ring
22c Bolt
24 (24a, 24b) Impeller-housing side contact surface
24a Impeller-housing side first contact surface
24b Impeller-housing side second contact surface
26 (26a, 26b) Bearing-housing side contact surface
26a Bearing-housing side first contact surface
26b Bearing-housing side second contact surface
28 (28a, 28b) Fastening-member side contact surface
28a Fastening-member side first contact surface
28b Fastening-member side second contact surface
30 (30a, 30b, 30c, 30d) Thin-plate member
32 (32a, 32b, 32c, 32d) Recess portion
33 (33a, 33b) Protruding portion
34 Impeller-housing side flange portion
36 Bearing-housing side flange portion
38 Impeller-housing side protruding portion
40 Bearing-housing side protruding portion
41 Annular groove
42 First annular portion
44 Disc portion
46 Second annular portion
47 Seal member
48 Bearing-housing side extension portion
50 Impeller-housing side bolt receiving portion
52 Impeller-housing side extension portion
54 Screw hole
56 Washer

The invention claimed is:

1. A rotary machine, comprising:
a rotational shaft;
an impeller mounted to the rotational shaft;
an impeller housing accommodating the impeller;
a bearing housing accommodating a bearing which supports the rotational shaft rotatably, the bearing housing being fastened to the impeller housing; and
a fastener directly or indirectly attached to the impeller housing and the bearing housing and fastening the impeller housing and the bearing housing in an axial direction of the rotational shaft,
wherein the impeller housing includes, at a fastening part to which a fastening force is applied by the fastener, impeller-housing side contact surfaces extending in a direction which intersects with an axial direction of the rotational shaft, the impeller-housing side contact surfaces including an impeller-housing side first contact surface in contact with the fastener and an impeller-housing side second contact surface in contact with the bearing housing,
wherein the bearing housing includes, at the fastening part, bearing-housing side contact surfaces extending in a direction which intersects with the axial direction of the rotational shaft, the bearing-housing side contact surfaces including a bearing-housing side first contact surface in contact with the fastener and a bearing-housing side second contact surface in contact with the impeller housing,
wherein the fastener includes fastening-member side contact surfaces extending in a direction which intersects with the axial direction of the rotational shaft, the fastening-member side contact surfaces including a fastening-member side first contact surface in contact with the impeller housing and a fastening-member side second contact surface in contact with the bearing housing,
wherein a thin-plate member is interposed in at least one location between the impeller-housing side first contact surface and the fastening-member side first contact surface, between the bearing-housing side first contact surface and the fastening-member side second contact surface, or between the impeller-housing side second contact surface and the bearing-housing side second contact surface, the thin-plate member being provided separately from the impeller housing, the bearing housing, and the fastener,
wherein the impeller housing includes an impeller-housing side flange portion extending outward in a radial direction of the rotational shaft,
wherein the bearing housing includes a bearing-housing side flange portion which is in contact with the impeller-housing side flange portion, the bearing-housing side flange portion extending outward in the radial direction of the rotational shaft,
wherein the impeller-housing side second contact surface is formed on the impeller-housing side flange portion, and the bearing-housing side second contact surface is formed on the bearing-housing side flange portion,
wherein the fastener comprises a coupling which holds together the impeller-housing side flange portion and the bearing-housing side flange portion,
wherein the thin-plate member is a single thin-plate member in contact with the impeller-housing side first contact surface and the fastening-member side first contact surface, and in contact with the bearing-housing side first contact surface and the fastening-member side second contact surface.

2. The rotary machine according to claim 1,
wherein at least one of the impeller-housing side first contact surface, the impeller-housing side second contact surface, the bearing-housing side first contact surface, the bearing-housing side second contact surface, the fastening-member side first contact surface, or the fastening-member side second contact surface includes at least one recess portion.

3. The rotary machine according to claim 2,
wherein the at least one recess portion includes a plurality of recess portions disposed at intervals in a circumferential direction of the rotational shaft.

4. The rotary machine according to claim 2,
wherein the at least one recess portion is formed on at least one of two of the contact surfaces forming at least one location where the thin-plate member is interposed, between the impeller-housing side first contact surface and the fastening-member side first contact surface, between the bearing-housing side first contact surface and the fastening-member side second contact surface, or between the impeller-housing side second contact surface and the bearing-housing side second contact surface.

5. A rotary machine, comprising:
a rotational shaft;
an impeller mounted to the rotational shaft;
an impeller housing accommodating the impeller;
a bearing housing accommodating a bearing which supports the rotational shaft rotatably, the bearing housing being fastened to the impeller housing; and
a fastener directly or indirectly attached to the impeller housing and the bearing housing and fastening the impeller housing and the bearing housing in an axial direction of the rotational shaft,
wherein the impeller housing includes, at a fastening part to which a fastening force is applied by the fastener, impeller-housing side contact surfaces extending in a direction which intersects with an axial direction of the rotational shaft, the impeller-housing side contact surfaces including an impeller-housing side first contact surface in contact with the fastening member and an impeller-housing side second contact surface in contact with the bearing housing,
wherein the bearing housing includes, at the fastening part, bearing-housing side contact surfaces extending in a direction which intersects with the axial direction of the rotational shaft, the bearing-housing side contact surfaces including a bearing-housing side first contact surface in contact with the fastening member and a bearing-housing side second contact surface in contact with the impeller housing,
wherein the fastener includes fastening-member side contact surfaces extending in a direction which intersects with the axial direction of the rotational shaft, the fastening-member side contact surfaces including a fastening-member side first contact surface in contact with the impeller housing and a fastening-member side second contact surface in contact with the bearing housing,
wherein a thin-plate member is interposed in at least one location between the impeller-housing side first contact surface and the fastening-member side first contact surface, between the bearing-housing side first contact surface and the fastening-member side second contact surface, or between the impeller-housing side second contact surface and the bearing-housing side second contact surface, the thin-plate member being provided separately from the impeller housing, the bearing housing, and the fastener,
wherein the impeller housing includes an impeller-housing side protruding portion extending inward with respect to a radial direction of the rotational shaft,
wherein the bearing housing includes a bearing-housing side protruding portion which is in contact with the impeller-housing side protruding portion and which extends outward in the radial direction of the rotational shaft,
wherein the impeller-housing side second contact surface is formed on the impeller-housing side protruding portion, and the bearing-housing side second contact surface is formed on the bearing-housing side protruding portion, and
wherein the fastener comprises a snap ring to be fitted into an annular groove formed on an inner peripheral surface of the impeller housing, the snap ring being configured to bias the bearing-housing side second contact surface toward the impeller-housing side second contact surface by engagement of an outer peripheral portion of the snap ring with the annular groove.

6. The rotary machine according to claim 5,
wherein the thin-plate member is interposed between the impeller-housing side second contact surface and the bearing-housing side second contact surface.

7. The rotary machine according to claim 6,
wherein the thin-plate member includes:
a first annular portion which is interposed between a tip surface of the impeller-housing side protruding portion and an end surface of the bearing housing and which extends in the axial direction of the rotational shaft;
a disc portion which is interposed between the impeller-housing second contact surface and the bearing-housing side second contact surface and which extends in the radial direction of the rotational shaft; and
a second annular portion interposed between a tip surface of the bearing-housing side protruding portion and an end surface of the impeller housing, and
wherein the first annular portion, the disc portion, and the second annular portion are formed integrally.

8. The rotary machine according to claim 5,
wherein the thin-plate member is interposed between the fastening-member side second contact surface and the bearing-housing side first contact surface.

9. A rotary machine, comprising:
a rotational shaft;
an impeller mounted to the rotational shaft;
an impeller housing accommodating the impeller;
a bearing housing accommodating a bearing which supports the rotational shaft rotatably, the bearing housing being fastened to the impeller housing; and
a fastener directly or indirectly attached to the impeller housing and the bearing housing and fastening the impeller housing and the bearing housing in an axial direction of the rotational shaft,
wherein the impeller housing includes, at a fastening part to which a fastening force is applied by the fastener, impeller-housing side contact surfaces extending in a direction which intersects with an axial direction of the rotational shaft, the impeller-housing side contact surfaces including an impeller-housing side first contact surface in contact with the fastener and an impeller-housing side second contact surface in contact with the bearing housing,
wherein the bearing housing includes, at the fastening part, bearing-housing side contact surfaces extending in a direction which intersects with the axial direction of the rotational shaft, the bearing-housing side contact surfaces including a bearing-housing side first contact surface in contact with the fastener and a bearing-housing side second contact surface in contact with the impeller housing,
wherein the fastener includes fastening-member side contact surfaces extending in a direction which intersects with the axial direction of the rotational shaft, the fastening-member side contact surfaces including a fastening-member side first contact surface in contact with the impeller housing and a fastening-member side second contact surface in contact with the bearing housing, wherein at least one of the impeller-housing side first contact surface, the impeller-housing side second contact surface, the bearing-housing side first contact surface, the bearing-housing side second contact surface, the fastening-member side first contact surface, or the fastening-member side second contact surface includes at least one recess portion, wherein the at least one recess portion includes a plurality of recess portions disposed at intervals in a circumferential direction of the rotational shaft, wherein the plurality of recess portions satisfies any one of following conditions (a) to (c);

(a) each of the plurality of recess portions having a flat surface is formed at regular intervals in the circumferential direction of the rotational shaft;

(b) each of the plurality of recess portions is formed at regular intervals between protruding portions, each protruding portion formed to have a wavy cross section; and (c) each of the plurality of recess portions is formed at regular intervals between a plurality of arcs formed at regular intervals.

10. The rotary machine according to claim 9, wherein the impeller housing includes an impeller-housing side protruding portion extending inward with respect to a radial direction of the rotational shaft, wherein the bearing housing includes a bearing-housing side protruding portion which is in contact with the impeller-housing side protruding portion and which extends outward in the radial direction of the rotational shaft, wherein the impeller-housing side second contact surface is formed on the impeller-housing side protruding portion, and the bearing-housing side second contact surface is formed on the bearing-housing side protruding portion, and wherein the fastener comprises a snap ring to be fitted into an annular groove formed on an inner peripheral surface of the impeller housing, the snap ring being configured to bias the bearing-housing side second contact surface toward the impeller-housing side second contact surface by engagement of an outer peripheral portion of the snap ring into the annular groove.

11. The rotary machine according to claim 10, wherein the protruding portion is formed on the fastening-member side second contact surface.

12. The rotary machine according to claim 9, wherein the bearing housing includes a bearing-housing side extension portion extending outward in a radial direction of the rotational shaft, wherein the impeller housing includes an impeller-housing side bolt receiving portion positioned on an outer side of the bearing-housing side extension portion, with respect to the radial direction of the rotational shaft, and an impeller-housing side extension portion which is in contact with the bearing-housing side extension portion and which extends inward in the radial direction of the rotational shaft from the impeller-housing side bolt receiving portion, wherein the impeller-housing side second contact surface is formed on the impeller-housing side extension portion, and the bearing-housing side second contact surface is formed on the bearing-housing side extension portion, and wherein the fastener comprises a bolt screwed into a screw hole formed on the impeller-housing side bolt receiving portion, the bolt being configured to bias the bearing-housing side second contact surface toward the impeller-housing side second contact surface by being screwed into the screw hole.

\* \* \* \* \*